S. D. MOTT.
Medicine Measuring Tube.
No. 230,960. Patented Aug. 10, 1880.
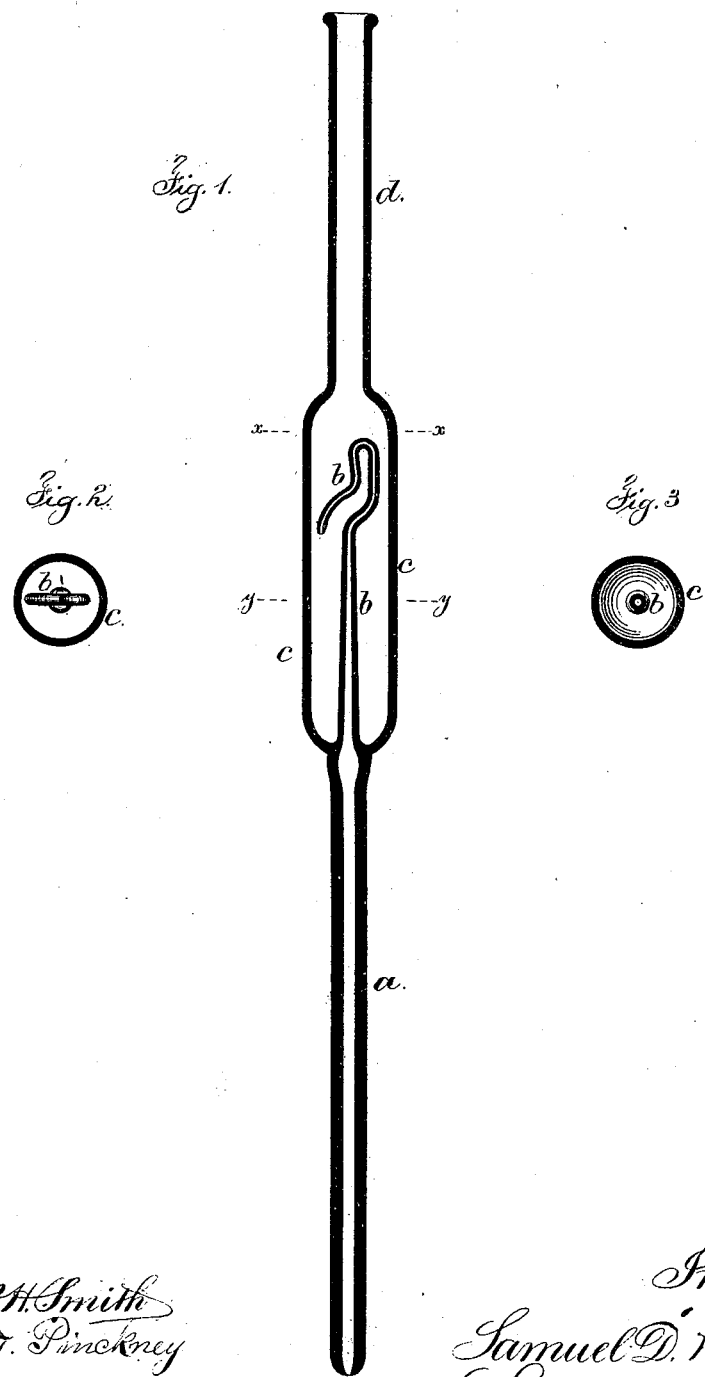
Witnesses
Chas H Smith
Geo T Pinckney
Inventor
Samuel D. Mott
per Lemuel W. Serrell
atty

UNITED STATES PATENT OFFICE.

SAMUEL D. MOTT, OF MENLO PARK, NEW JERSEY.

MEDICINE-MEASURING TUBE.

SPECIFICATION forming part of Letters Patent No. 230,960, dated August 10, 1880.

Application filed December 31, 1879.

*To all whom it may concern:*

Be it known that I, SAMUEL D. MOTT, of Menlo Park, in the State of New Jersey, have invented an Improvement in Medicine-Measuring Tubes, of which the following is a specification.

Great difficulty arises in measuring small quantities of medicine, especially where the same is contained in a large bottle; and, besides this, the swallowing of liquid medicines of an acid character is often injurious to the teeth and generally disagreeable to the taste.

My invention is made for safely withdrawing small quantities of medicines, acids, or other liquids from the containing-vessel and measuring the same either by drops or in the containing-tube, and the tube is adapted to being introduced into the mouth and its contents poured into the throat, so as to avoid unnecessary contact with the mouth or teeth.

In the drawings, Figure 1 is a vertical section of the measuring-tube, and Fig. 2 is a plan at the line $x\, x$. Fig. 3 is a plan at the line $y\, y$.

The small tube $a$ is of a convenient length to be introduced into the bottle or vessel containing the liquid. Its upper end is, by preference, contracted to the fine tube $b$, within the receiving-measure $c$, and this measure $c$ is in turn extended as a mouth-tube, $d$.

The entire device is preferably made of glass, and its mode of use is as follows: The tube $d$ is placed in the mouth and the end of the tube $a$ dipped into the liquid to be taken up in a small measured quantity. The atmosphere is exhausted sufficiently to draw the liquid up in the tube $a\, b$, and it flows from the upper end of $b$ in a very fine stream into the measure $c$, or it may drop from the returned end of $b$. In either instance the measure may be by drops or by marks or graduations upon the vessel $c$, so that the person can easily draw the liquid into the vessel $c$ to any required extent.

To facilitate inspection the tube $d$ may be curved or bent at an angle to the tube $a$; but generally it will be easy to observe the dropping of the liquid or the supply into the measure with a straight instrument.

After the quantity has been drawn into the measure the partial vacuum is to be relieved and the air blown from the mouth, so as to empty the tube $a$. This does not in any manner affect the liquid in the measure, and the same is to be poured out through the tube $d$ into the mouth or into any vessel or receptacle.

This device is very convenient for druggists, physicians, and others, and is a cheap and reliable article that can be used to take the place of the ordinary small druggists' measures and as a substitute for the glass tubes often employed in taking medicine.

If desired, water or sirup can be drawn into the measure before or after the medicine, and the druggist's measure of any desired size can be made in this manner, so as to receive different liquids in succession.

The graduations are to be of any usual character, and I remark that this instrument can be washed out with water or alcohol, drawn in, as aforesaid.

I claim as my invention—

The combination, with the measure $c$, of the mouth-tube $d$, supply-tube $a$, and tube $b$, passing up inside the measure, substantially as set forth.

Signed by me this 3d day of November, A. D. 1879.

SAML. D. MOTT.

Witnesses:
CHAS. T. HUGHES,
WM. CARMAN.